May 11, 1926.
P. W. PETERSEN
1,584,191
METHOD AND APPARATUS FOR REFRIGERATING COMESTIBLES
Filed April 13, 1923   2 Sheets-Sheet 1
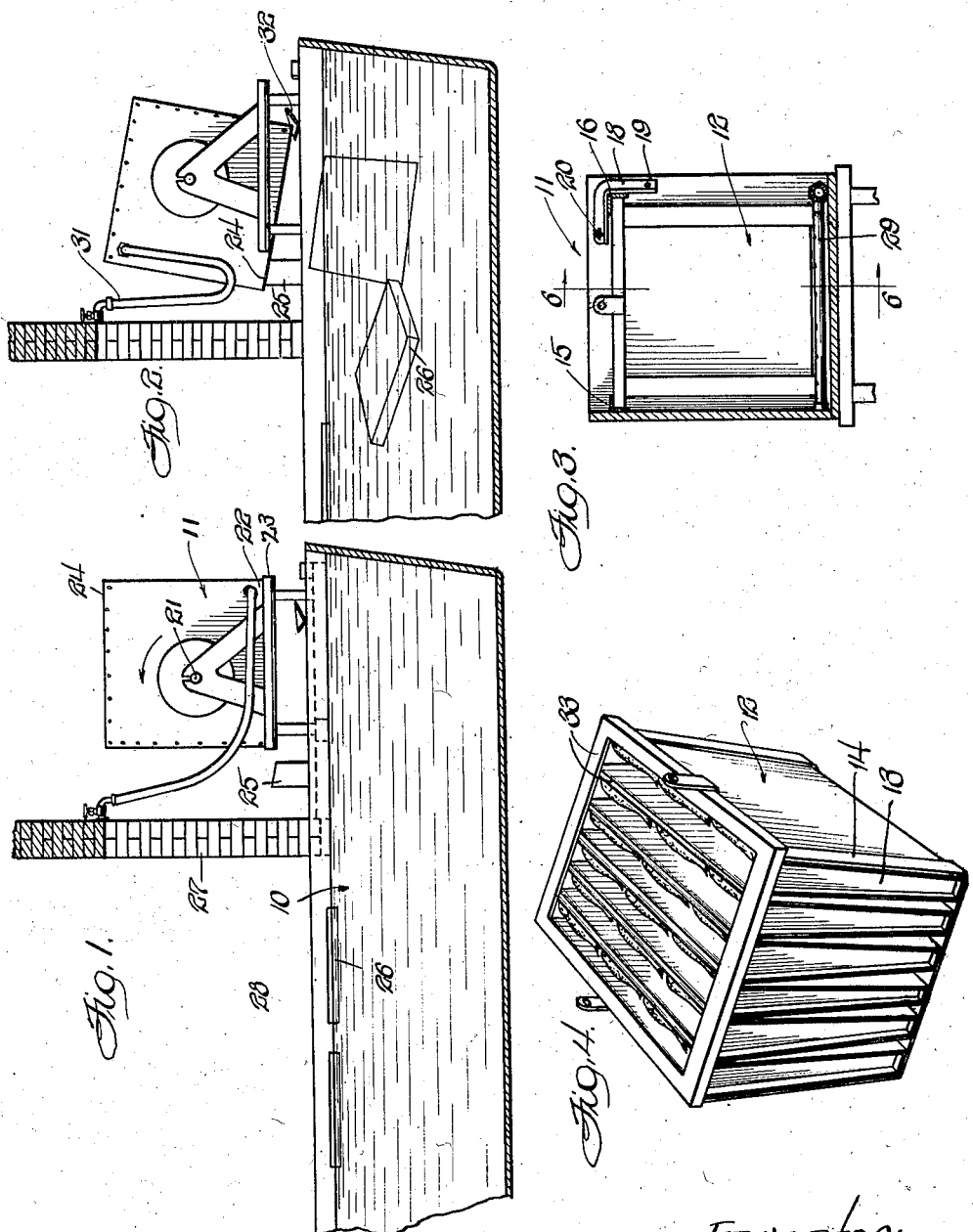
Inventor:
PAUL W. PETERSEN

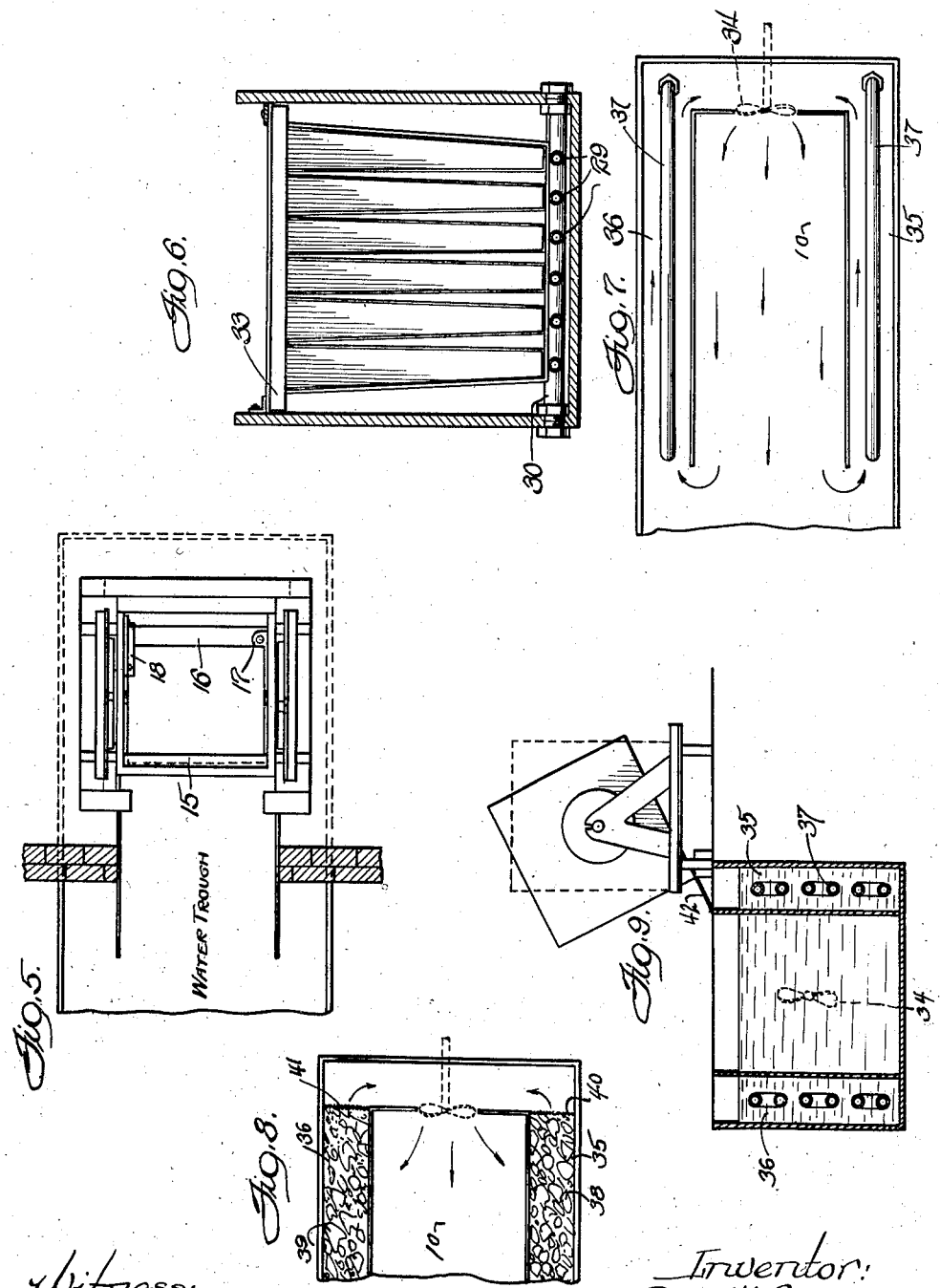

Patented May 11, 1926.

1,584,191

UNITED STATES PATENT OFFICE.

PAUL W. PETERSEN, OF BAY CITY, MICHIGAN.

METHOD AND APPARATUS FOR REFRIGERATING COMESTIBLES.

Application filed April 13, 1923. Serial No. 631,932.

This invention relates to methods and apparatus for treating comestibles and more particularly to methods and apparatus for refrigerating and handling comestibles.

It has been my experience that it is desirable to refrigerate or freeze certain comestibles, for example fish, in water-tight containers immersed in a liquid refrigerant. Such containers are preferably made of appreciable weight but of narrow cross section and in many instances I prefer to use a plurality or group of such containers permanently attached together in a frame. These factors lead to the desirability of special apparatus for removing the frozen cakes of comestibles from such containers or group of containers, not only because of the difficulties of manually handling the containers and effecting the release of the frozen comestible, but because of the fact that under certain circumstances if the cakes of comestible are emptied out onto a solid surface, they will be subject to mechanical injury as a result of the impact with the solid surface and with each other.

The preferred embodiment of my invention is designed to provide a novel form of device and process for emptying the comestible containers whereby the contents are allowed to fall directly, or substantially directly, into a body of water. The body of water used in this connection simultaneously provides several distinct advantages since it first offers a cushioning means to receive the frozen cakes of comestible without mechanical injury either through impact with the water or impact against each other as they are dumped from the container; the water further serves to impact at once a protective glazing of ice to the surface of a frozen comestible when dropped therein; furthermore, the same body of water, if desired, may be used as a conveyor by means of which the comestible dumped therein may be floated to a remote point such as to a storage room.

Contamination and injury are often effected by dumping the contents of containers in a manner to permit the comestible to fall out upon a hard surface. It is often difficult to release the comestible without approximately fully inverting the container and if the comestible is then allowed to fall upon a solid surface, mechanical injury is almost certain to result. On the other hand, if the dumping is effected by merely tilting the containers upon their side, an excessive amount of warming and thawing is often necessary in order to release the frozen cake from the side walls.

With the process comprising my invention, a product may be obtained which is of improved appearance and of dependable quality. The advantages of substantially fully inverting the containers may preferably be employed, since the amount of necessary thawing is thereby reduced.

Another aim of my invention is to provide a process and device of the character indicated whereby a plurality of cakes of a frozen comestible may be simultaneously emptied from their respective containers or from a group of containers, without injury to the comestibles. Furthermore, I have provided in the same device as used for emptying the containers, an additional improvement for warming the containers in order to release the adhering frozen comestible from the container walls by thawing.

A further particular object of my invention is to provide a method and equipment which is especially adapted to the releasing and emptying of comestibles of the nature of fish from containers in which they have been refrigerated, although it is to be understood that other varieties of comestibles may be treated by this process and equipment, and hence I do not desire to be limited to the use of the invention with this particular comestible.

Another object of this invention is to provide apparatus of the character indicated which shall be convenient and durable in use and economical and simple in construction.

Other objects of the invention will become apparent from the following description, the accompanying illustrations and the appended claims.

For the purpose of illustration and description, several specific embodiments of the invention are shown in the accompanying drawings, in which—

Figure 1 is an elevational view of an emptying device embodying my invention, together with a sectional view of the glazing and conveying trough of water used therewith. The device is shown in normal position for receiving a comestible container;

Fig. 2 is a view similar to Fig. 1 but showing the emptying device in an inverted position;

Fig. 3 is a sectional view of the emptying device with a container therein;

Fig. 4 is a detail perspective view of a comestible container that may be used in connection with the equipment illustrated in Figs. 1 to 3;

Fig. 5 is a plan view of the structures illustrated in Figs. 1 and 2;

Fig. 6 is a sectional view taken substantially upon the line 6—6 of Fig. 3;

Figs. 7 and 8 are schematic views illustrating two forms of glazing and conveying troughs of a type that may be used in connection with the apparatus shown in Fig. 1; and, Fig. 9 is a view similar to Fig. 2 but illustrating a modified form of emptying device.

In a general way the device illustrated in the drawings comprises a trough of water 10 over or adjacent to which is positioned a tiltably mounted frame or emptying device 11, which is adapted to removably retain a plurality or group of containers 12 such as shown in Fig. 4.

The group of containers 12 may preferably comprise a number of narrow elongated spaced compartments as at 13, attached to a frame 14. The comestibles to be frozen may be packed within the various compartments 13, after which the entire group of containers may be immersed in a liquid refrigerant. The compartments, as illustrated, are of suitable dimensions and are properly arranged to permit the refrigerant to come into close proximity of all portions of the comestibles. After the freezing is completed, the containers may be removed and placed in a warming bath consisting of a body of fairly tepid water which serves to thaw the contents sufficiently to overcome the adhesion of the frozen comestible to the side walls of the containers.

If preferred, the warming process may be performed by special apparatus forming a part of the emptying device and hereinafter described. In practice it has been found convenient to use both methods of warming, the major portion of the warming being accomplished in a warming bath and while the containers are in a tilted position in the emptying device, they may be finally warmed by an amount just sufficient to effect the release of the comestibles.

The containers may be securely fixed within the frame or rack 11 by an angle iron 15 fixed along one top edge of the frame and a pivoted angle iron 16 along the opposite top edge of the frame. The angle iron 16 may be pivoted as shown at 17 (Fig. 5) so that it may be turned to a position to permit the containers to be placed in and removed from the frame. The angle iron 16 may be locked in position at its opposite end by a hook member 18 pivoted to the frame at 19 and removably fixed at its upper end by a pin 20 or by other suitable means.

The frame 11 may be pivoted upon trunnions as indicated at 21. It will be noted that the trunnions are placed to the left of and below the center of the frame in order that the frame will be over-balanced at one side and will normally assume a position with its edge 22 resting upon a support member 23. However, after the containers have been locked into the frame when in the position indicated in Fig. 1, the operator may turn the frame upon its trunnions into the position shown in Fig. 2 whereby the edge 24 of the frame will come into contact with a stop member 25. The frame, together with the containers, will then be in a substantially inverted position permitting the contents of the container to drop into the body of water in the trough 10. When the frame 11 is inverted in the above indicated manner, the edge 24 will abruptly strike the stop member 25 thereby giving the container a sufficient jolt to aid in the emptying of the comestible cakes 26 therefrom. The frame may preferably be designed in such a manner that it will return to its normal position, indicated in Fig. 1, practically of its own accord.

Meanwhile the comestible which has fallen from the container will strike the body of water at a slight angle such as will impart to the frozen comestible a sufficient forward movement to insure its conveyance to a remote point in the trough, as for example, beneath a wall as at 27 and into a cold storage room 28 by floating in and upon the water.

The water during this time will not only serve the purpose of a conveyor but will also serve to receive the comestible without imparting mechanical injury thereto either from impact with the water or from the impact of one cake of the frozen comestible upon another. My experience has shown that it is desirable to avoid mechanical injury to comestibles while in a frozen condition, since upon thawing they may assume an undesirable appearance and texture at the injured part.

While the comestible is floating along the trough, the water also serves to impart thereto a uniform protective glazing of clear ice having the desirable properties above referred to. The comestibles may be removed from the trough 10 and packed or stored in a storage room or transported away, as desired.

As above stated, a part or all of the warming of the containers to release the frozen comestible may be accomplished, if desired, while the containers are within the frame 11. For this purpose perforated pipes, as at 29, may be positioned beneath each compartment in the frame 11. The pipes 29 may be all connected to a feed pipe 30 which in turn may be attached to a source of supply of the warm water by means of a flexible hose 31. When the containers are in their tilted substantially inverted position, the water from the pipes 29 will spray down around each of the compartment walls and may be carried away by a drip trough, such as indicated at 32. As soon as sufficient thawing has taken place as a result of the warming of the containers, and because of gravity, the comestible cakes will slide out and thus any unnecessary thawing will be avoided. The container frame 14 may be provided with any suitable arrangement, such as the channel members at 33 which serve to receive the warm water as sprayed upon the containers and prevent such water from draining into the trough 10, the water in which should remain cold. The overflow from the channels 33 is allowed to drain into the trough 32.

In some instances it may be desirable to allow the cakes of frozen comestible as at 26 to float along the trough 10 by their own inertia, resulting from striking the surface of the water at a slight angle. However, in case a more positive or rapid method of conveyance is desired, the water may be forced to circulate by any suitable device, as by a propeller 34 (Figs. 7 and 8). The propeller may be arranged to force the water outwardly through the main portion of the trough in which the comestible is floated. Side channels as at 35 and 36 may be used to provide for returning the water to the propeller, as indicated in Fig. 7.

The water in the trough may be cooled in any suitable manner, as for example while returning through the side troughs. In Fig. 7, refrigerating coils 37 are shown for the purpose of effecting the cooling, whereas in Fig. 8 quantities of ice at 38 and 39 are shown in the side channels 35 and 36, respectively. In order to prevent the passage of the ice into the region of the propeller 34 or into the main portion of the trough, screens 40 and 41 may be provided respectively in the channels 35 and 36. The ice is accordingly effectively prevented from entering the main portion of the trough where it would possibly cause injury to the cakes of frozen comestible as dropped therein and also where small pieces of the ice might adhere and freeze to the comestibles.

In Fig. 9 a modified type of emptying device is illustrated in which the containers are not substantially inverted but are merely tilted downwardly at a small angle. The normal position of such a device is indicated by the dotted lines. In certain cases the use of such a device may be preferable, especially if rapid operation with large or heavy containers is necessary.

This arrangement also offers a convenient means for handling comestibles, such as large fish which require compartively long containers and which are consequently more difficult to completely invert.

As here illustrated the tilting frame may be conveniently positioned adjacent to and above the trough of water but slightly to one side thereof. A slide or runway 42 may be provided, if desired, for deflecting the comestibles into the water although in many installations such a slide is unnecessary.

While I have illustrated in detail and have described several possible embodiments of the structure and processes comprising my invention, it is to be understood that I desire only such limitations placed thereon as are set forth in the appended claims and as may be required by the prior art.

Having thus described my invention, what I claim as new and desire to secure by Letters Patent in the United States, is:

1. The method of removing cakes of refrigerated comestibles of substantial weight from a container which comprises raising the temperature of the container to assist the releasing of the refrigerated comestibles from the walls thereof, but without excessive thawing, and tilting and abruptly jolting the container over a body of water whereby the comestibles are permitted to fall into the water to be received thereby without mechanical injury to the comestibles.

2. The method of treating and conveying a frozen comestible which comprises placing the frozen comestible in an elongated trough filled with cold water whereby a protective glazing of ice is imparted to the surface of the comestible and mechanical means for imparting movement to the water in said trough whereby the comestible may be simultaneously conveyed to a remote point by floating in the water.

3. The method of treating and handling a comestible which comprises first freezing the comestible within a container in the presence of a refrigerant, then raising the temperature of the container to assist the releasing of the frozen comestible from the walls thereof, then forcibly emptying the comestible without excessive thawing by abrupting tilting the container over a body of water whereby the comestible is permitted to fall into the water to be received thereby without injury, and a glazing of ice is imparted to the surface thereof, and whereby the comestible may be at the same time conveyed to a remote point by floating in the water.

4. The method of treating and handling comestibles which comprises first freezing a plurality of individual units of the comestibles together in a cake within a container in the presence of a refrigerant, then raising the temperature of the container and abruptly tilting the container at an angle over a body of cold water in order to release the cake of frozen comestibles from the walls thereof without excessive thawing and whereby the comestible is permitted to fall directly into the water to be received thereby without injury, and whereby a glazing of ice is imparted to the surface of the cake of frozen comestibles and also whereby the comestibles may be conveyed as a result of their momentum to a remote point by floating in the water.

5. The method of treating and handling a comestible which comprises first freezing the comestible within a container in the presence of a refrigerant, then substantially fully inverting the container over a body of water, and also warming said container but only sufficiently to release the frozen comestibles from the walls thereof whereupon the comestible without excessive thawing is permitted to fall into the water to be received thereby without injury.

6. Means for refrigerating and handling comestibles which comprises a container within which the comestibles may be refrigerated, said container being open at its top, a rack for receiving said container, retaining means on said rack for removably retaining said container within said rack, and supporting means for said rack whereby said rack together with said container may be substantially fully inverted to permit the comestible to fall directly out of said container without appreciable abrasion.

7. Means for handling refrigerated comestibles which comprises a group of containers for the comestibles each of said containers being open along one of their edges, a rack for receiving said group of containers, means on said rack for removably retaining said containers within said rack, and supporting means for said rack whereby said rack together with said containers may be substantially fully inverted to permit the comestibles to fall directly out of said containers without appreciable abrasion.

8. Apparatus for handling a refrigerated comestible which comprises a container for the comestible, said container having an opening, means for holding a body of water, means adjacent said first named means for supporting and tilting said container and means for abruptly jolting the container when tilted to cause the comestible to fall from said container through said opening into said body of water, said body of water serving as a receiving and cushioning means for the comestible.

9. Apparatus for handling and refrigerating comestibles which comprises a container for retaining a plurality of units of the comestible while being frozen in a cake therein, means for holding a body of water, and means adjacent said first named means for tiltably supporting said container whereby the cake of frozen comestible therein may be emptied into said body of water, said body of water serving as a receiving and cushioning means and also as a means for imparting a glaze of ice to the frozen cake of comestible.

10. Means for handling refrigerated comestibles which comprises a group of containers for the comestibles, each of said containers being open along one of their edges, means for holding a body of water, a rack adjacent said first named means for receiving said group of containers, means on said rack for removably retaining said containers therein, and supporting means for said rack whereby said rack together with said containers may be substantially fully inverted over the water to permit the comestible to fall directly out of said containers into the water to be received thereby without mechanical injury to the comestibles.

11. Means for refrigerating and handling comestibles which comprises a container within which the comestibles may be refrigerated, said container being open at its top, a rack for receiving said container, retaining means on said rack for removably retaining said container within said rack, means on said rack for placing a warming medium in contact with said container to release the refrigerated comestible from the walls thereof, and supporting means for said rack whereby said rack together with said container may be substantially fully inverted to permit the comestible to fall directly out of said container.

12. Apparatus for handling a frozen comestible which comprises a container within which the comestible is frozen, said container having an opening, means for holding a body of water, and means adjacent said first named means for supporting, warming and abruptly jolting said container to release the frozen comestible from the walls thereof, said means being tiltable whereby the comestible therein may be emptied out through said opening and directly into said body of water.

13. Apparatus for handling a frozen comestible which comprises a container within which the comestible is frozen, said container having an opening, means for holding a body of water, a substantially fully invertible rack adjacent said first named means for supporting said container and emptying the contents thereof directly into said body of water, and means on said rack for placing a warming medium in contact with said container while inverted to release the frozen comestible from the container walls.

14. Means for refrigerating and handling comestibles which comprises a container within which the comestibles may be refrigerated, said container being open at its top, a rack for receiving said container, retaining means on said rack for removably retaining said container within said rack, means for pivotally supporting said rack whereby said rack together with said container may be substantially fully inverted, and means for abruptly stopping the container upon reaching the inverted position to cause the comestible to fall directly out of said container.

In witness whereof, I have hereunto subscribed my name.

PAUL W. PETERSEN.